United States Patent Office 3,283,210
Patented Nov. 1, 1966

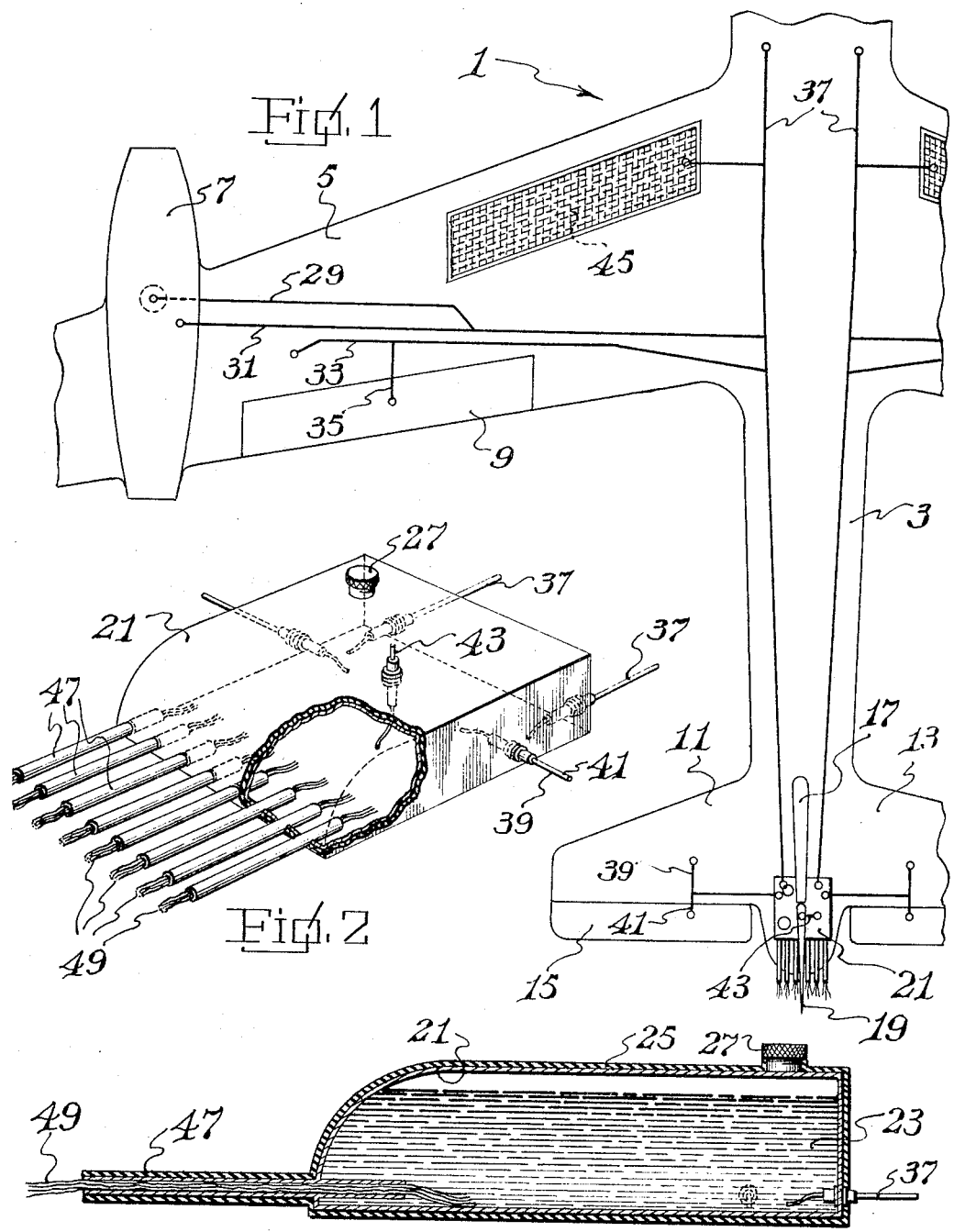

3,283,210
APPARATUS FOR DISCHARGING STATIC ELECTRICITY FROM VEHICLES IN FLIGHT
Martin V. Welsh, 1335 S. Indianapolis Ave., Tulsa, Okla.
Filed May 11, 1964, Ser. No. 366,451
4 Claims. (Cl. 317—2)

The present invention relates to flying craft having provision for avoiding the buildup of high static charges thereon, and apparatus for discharging static from such craft while in flight.

As is well known, airplanes and other flying vehicles tend to build up static charges when passing through the atmosphere, which are not discharged sufficiently rapidly at high altitude to avoid an accumulation of static charges on the vehicle. The result is often that a spark will leap between the aircraft and the ground upon landing or between the vehicle and a differently changed body. Needless to say, this phenomenon carries with it the risk of a fuel fire and others obvious dangers.

Not only is a potential difference between an aircraft and the ground dangerous to the operation of the aircraft, but also a danger arises in flight in that static charges of different intensity tend to build up on various parts of flying vehicles. If these charges are not continuously discharged, then the potential difference between various portions of the vehicle may be sufficiently high that a spark will jump while the vehicle is still in flight, with the same danger of fuel fire or explosion.

Other dangers attend the build-up of static charges on vehicles in flight. Among these are the fact that magnetic fields are set up that cause parts to vibrate and weaken. Such magnetic fields also cause heating of the parts and may give rise to temperatures sufficiently high to ignite fuel vapors.

Accordingly, it is an object of the present invention to provide flying vehicles having means for progressively or continuously discharging static electricity from the vehicle while in flight.

It is also an object of the present invention to provide apparatus for preventing the accumulation of static charges of different potential on different portions of vehicles during flight.

Finally, it is an object of the present invention to provide apparatus for discharging static electricity from vehicles in flight, which will be relatively simple and inexpensive to manufacture and install, dependable in operation, and rugged and durable in use.

Other objects and advantages of the present invention will become apparent from a consideration of the following description, taken in connection with the accompanying drawing, in which:

FIGURE 1 is a somewhat schematic view of an aircraft provided with static electric discharge means according to the present invention;

FIGURE 2 is a fragmentary perspective view of static electric discharge means according to the present invention; and FIGURE 3 is an elevational cross-sectional view of static electricity discharge means according to the present invention.

Referring now to the drawing in greater detail, there is shown an aircraft in the form of an airplane indicated generally at 1, having a fuselage 3 including the usual wings 5 that provide storage space for fuel, and engines 7 carried in nacelles on the wings. The wings also include the usual ailerons 9 that can be varied in inclination relative to the wings to regulate the flight of the airplane.

Airplane 1 also has the usual tail assembly 11 including fixed horizontal stabilizers 13 and vertically swingable elevators 15, as well as the usual vertical stabilizer 17 with a horizontally swingable rudder 19, all for steering the aircraft and regulating its flight characteristics.

As thus far described, the structure of the aircraft may be entirely conventional.

The static discharge apparatus of the present invention includes a container 21 carried by the tail assembly of the aircraft. Container 21 is adapted to contain a dielectric fluent material 23 which may be a finely divided solid or a liquid and is preferably a liquid. Fluent material 23 is preferably a dielectric organic liquid, more preferably a liquid carbohydrate, still more preferably a polyol, and most preferably glycerin. Glycerin is preferred because it is cheap and has a high dielectric coefficient and a suitably low viscosity, and also because it has greater attraction to static electric charges than have the hydrocarbonaceous aircraft fuels such as gasoline and kerosene.

Container 21 is preferably of a highly electrically conductive material such as copper, for a purpose that will appear later on, and is surrounded by insulation 25 so that it is electrically insulated from the rest of the aircraft except as will be explained later. A fill cap 27 is provided for replenishing the quantity of fluent material within container 21 from time to time as required.

The interior of container 21 is in electrical circuit with a number of different portions of the aircraft. To this end, ground lines or leads 29 are provided from the engines 7 to the interior of container 21. Leads 31 are provided from the engine nacelles to the container, leads 33 from the wings 5 to the container, leads 35 from the ailerons 9 to the container, leads 37 from the forward portion of the fuselage to the container, leads 39 from the horizontal stabilizers 13 to the container, leads 41 from the tail elevators 15 to the container, and leads 43 from the rudder 19 to the interior of the container. These leads terminate within container 21 adjacent a lower portion thereof, and are preferably grounded to the highly conductive material of container 21 so as to increase the area available for transfer of static charges between the leads and the fluent material within container 21. The interior of the fuel storage compartments within the wings is also grounded to the interior of container 21, by means of screens 45 that line the fuel tanks. Screens 45 are of a highly conductive material such as copper and by virtue of their screen configuration have an extended interface with the fuel within the fuel tanks.

Means are provided for progressively discharging the fluent material 23 from container 21 in finely divided form, comprising a plurality of conduits 47 disposed in a common horizontal plane when the aircraft is in normal horizontal flight. Conduits 47 communicate between the interior of container 21 and the rear of the aircraft behind any substantial aircraft structure. Wicks 49 of fibrous material, which may or may not be electrically conductive but in any event are highly absorbent to liquid, are disposed within conduits 47. The purpose of wicks 49 is to regulate the flow of liquid (when the dielectric fluent material 23 is a liquid) from the interior of container 21 rearwardly to be progressively discharged in finely divided form from the rear or free ends of wicks 49.

In operation, therefore, as the airplane is in flight, static charges that buildup on the various portions of the aircraft which are grounded to the dielectric fluent material pass to that dielectric material and are stored largely on the surface of the body of dielectric material. The surface of dielectric material in the case of a dielectric liquid within container 21, includes not only the surface of the material within the container but also the surface of the liquid exposed on the free ends of wicks 49. However, as the aircraft flies along, a region of low pressure is created immediately behind it so that liquid is continuously drawn from container 21 to wicks 49 and is discharged from the free ends of wicks 49 in a finely divided form as a multiplicity of droplets. As the droplets form, their surface area greatly increases, with the result that there is a transfer of the static charges from the body of liquid itself to the extended surface of the forming droplets. The droplets then fly free of the aircraft behind the aircraft into the slip stream of the aircraft and are thus cut off from contact with the aircraft. The static charges that they carry on their surface are thus discharged completely from the aircraft.

The continuous discharge of static charges from the fluent material 23 in container 21 assures that fluent material 23 will tend to be at a lower potential than other parts of the aircraft so that static electric charges will flow from other parts of the aircraft toward the fluent material in container 21. However, to augment this flow, particularly from the fuel in the tanks as picked up on screens 45, it is preferred that the fluent material within container 21 be not only a dielectric liquid and not only an organic liquid, but also a carbohydrate, preferably a polyol and most preferably glycerin, as the carbohydrates have a preferential affinity for static charges at their surface as compared to hydrocarbonaceous aircraft fuels such as gasoline and kerosene.

It will also be appreciated that the flow of fluent material from container 21 may be either continuous or intermittent, but in either case is progressive in that over an extended period of time portions of the fluent material leave container 21 never to return.

It will also be appreciated that if solid dielectric fluent material is discharged from a container such as container 21, discharge means (not shown) other than wick tubes will be provided but that the principles of the present invention will otherwise be carried out substantially the same as in the illustrated embodiment, in that the body of finely divided material will tend to concentrate static charges at its surface, so that as the particles of finely divided material separate from each other upon being discharged from the rear of the aircraft, the static charges will again concentrate on those spaced particles in preference to the body of unseparated particles that remain within the container.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. In a flying vehicle, a container for a body of dielectric fluent material, means electrically grounding at least one portion of the vehicle to the interior of the container, and means for progressively discharging portions of fluent material in the form of finely divided discrete particles of high total surface area from the container into the wake of the vehicle while the vehicle is in flight.

2. Apparatus as claimed in claim 1, and means electrically grounding a plurality of different portions of the vehicle to the interior of the container.

3. Apparatus as claimed in claim 1, and means electrically insulating the container from the rest of the vehicle except through said grounding means.

4. Apparatus as claimed in claim 1, said discharging means comprising wick means extending behind the vehicle to discharge a liquid dielectric material in the form of fine droplets to the wake of the vehicle in flight.

References Cited by the Examiner

UNITED STATES PATENTS

| | | | |
|---|---|---|---|
| 1,502,924 | 7/1924 | Stanley | 317—2 X |
| 1,940,491 | 12/1933 | Freitag | 317—2 X |
| 2,466,024 | 4/1949 | Hall | 317—2 X |

MILTON O. HIRSHFIELD, *Primary Examiner.*

SAMUEL BERNSTEIN, *Examiner.*

J. A. SILVERMAN, *Assistant Examiner.*